J. P. KOLB 2,566,988

SETTLING DEVICE

Filed Feb. 16, 1946

INVENTOR
JOHN P. KOLB
ATTORNEYS

Sept. 4, 1951  J. P. KOLB  2,566,988
SETTLING DEVICE
Filed Feb. 16, 1946  6 Sheets-Sheet 4

INVENTOR
JOHN P. KOLB
BY
ATTORNEYS

Sept. 4, 1951 J. P. KOLB 2,566,988
SETTLING DEVICE
Filed Feb. 16, 1946 6 Sheets-Sheet 5

INVENTOR
JOHN P. KOLB
BY
ATTORNEYS

Sept. 4, 1951  J. P. KOLB  2,566,988
SETTLING DEVICE

Filed Feb. 16, 1946  6 Sheets-Sheet 6

Patented Sept. 4, 1951

2,566,988

UNITED STATES PATENT OFFICE 2,566,988

SETTLING DEVICE

John P. Kolb, Queens Village, N. Y., assignor to General American Transportation Corporation, Chicago, Ill., a corporation of New York Application February 16, 1946, Serial No. 648,159

8 Claims. (Cl. 210—55)

This invention relates to settling devices, e. g., such as are employed in sewage disposal, paper making, chemical manufacturing and mining, etc., to separate suspended solids from fluids, and particularly to thickeners, classifiers, washers and the like of the type in which a suspension is brought under controlled settling conditions in a tank having arms mounted to turn about an axis within the tank, these arms carrying rakes or scraper blades so inclined, and otherwise adapted, as to effect a desired movement of the settled or settling solids upon movement of the arms. An apparatus of this general type is shown in the copending application Serial No. 588,278, filed April 14, 1945, now a Patent Number 2,553,958, May 22, 1951.

In the apparatus shown in that application, the blade- or scraper-carrying arms are mounted on a frame rotatably bearing on an elevator platform; and the rotation of the arms is effected through driving mechanism which is mounted on a tubular torque-reaction member which also serves to exclude the settling fluid from the elevator mechanism. The elevator serves, by bodily lifting of the scraper mechanism, independently of the rotation thereof, to allow the blades or scrapers to pass over excessive accumulations of sludge on the bottom of the tank and to be again gradually lowered for the gradual reworking of such excessive accumulations.

The arm driving and lifting mechanism of the said copending application is highly satisfactory for sedimentation apparatus of ordinary capacities, that is, where the diameter of the tank is not too great. For settling of very fine, semi-colloidal material it is desirable, however, to use much larger tanks; and when such tanks are made of very large capacity and correspondingly great diameter, e. g., of 100 yards or more, it becomes progressively more difficult to drive and to lift the blade-carrying arms from their central connections alone. It has been suggested heretofore to use long arms supported at the periphery on a circular track and various means have been proposed for lifting such arms or lifting the rakes relative to the arms, but such mechanisms are expensive and cumbersome. Moreover, a limit of practicable diameter is imposed on such rotary settling apparatus by the fact that an angular or rotational speed which will give a proper peripheral speed for scraper operation in the region of the outer reaches of said arms will give an excessively slow speed of travel of the rakes or scrapers carried thereby at a shorter radius near the axis of rotation. This not only imposes a practical limit on the size of such apparatus, but, even in the largest sizes actually used, has necessitated compromise between speeds suitable for operation near the center and those best for the periphery of the tank. Moreover, I have shown that it is not only very difficult, but undesirable, to lift a rake or scraper of such great diameter throughout its whole extent to accommodate overload which almost always is localized in the area near the outlet for settled matter.

Having regard to the problems presented in the operation of settling apparatus of comparatively great diameter, the present invention aims to provide a solution for these problems which will permit at least as efficient operation of the large apparatus as of the smaller; and which will allow a different treatment of the solids in the peripheral portions of the tank from that in the central portion, each controlled independently to its own requirements.

The slurry or pulp to be treated in apparatus of the general type to which the invention relates is usually delivered to the tank near the center pier so that the heavier solid constituents thereof usually settle out of the liquid not far from a central discharge trench of the tank. The lighter solids, and particularly those that are in colloidal form, tend to remain longer in suspension and are carried along by the fluid as it moves toward an overflow launder or other outlet at the outer rim of the tank. Because of the almost colloidal nature of many of these solids which are thus carried toward the fluid outlet in the tank, it is important that the rakes or scrapers, which are used to move such solids, travel at a rate of speed which will not cause much turbulence in the liquid. This requires a lower linear (i. e., circumferential) speed near the sludge outlet than near the raw material inlet, whereas, with a given angular speed, the linear speed is directly proportional to the radius from the axis of rotation, thus giving the opposite condition in a conventional tank.

According to the present invention, therefore, those rakes or scrapers near the sludge outlet which are handling the heavier sludges are moved more rapidly than the scrapers near the outlet for clarified fluid. Thus I avoid redispersion of semi-colloidal solids. Using a more or less conventional tank, the inner rakes or scrapers are, according to the present invention, carried on separate shorter arms driven at a different rate from the longer arms on which the outer rakes or scrapers are carried.

Moreover, although, as above suggested, it is desirable to drive the central scraper mechanism from a central drive gear, to drive the longer arms from central gearing imposes such stresses on the gears as to become impracticable before the best size is reached for settling of semi-colloidal material; and therefore the invention contemplates effecting the movement of these arms through the tank about the center thereof by traction drives at their outer ends. Likewise, although it has been recognized as desirable to raise and lower the scraper by a centrally positioned elevator, with very long arms the leverage of lifting stresses becomes excessive so that very large tanks have not been considered practicable where raising and lowering of scrapers is required.

Since, as above stated, the settling which takes place in the outer reaches of a conventional tank is of the lighter and finer material, often of semi-colloidal character, the accumulations on these areas at the tank bottoms are rarely, if ever, sufficient to interfere with the movements of the blades or scrapers or to cause any substantial overloads; while the heavier sedimentation occurring in the central region is more apt to cause overloads, especially by reason of the varying character of the inputs into the thickener and the more rapid settling thereof. The invention, therefore, contemplates providing means for lifting the rake- or blade-carrying arms without lifting the blades or scrapers near the outlet for clarified fluid.

Although the problems discussed above are most acute in very large tanks, the advantages of the present invention are not limited thereto. Even in much smaller apparatus there is advantage in the use of the localized lifting and different drive of the present invention.

Other objects and important features of the invention to which reference has not specifically been made hereinabove will appear hereinafter when the following description and claims are considered in connection with the accompanying drawings.

In this specification and the accompanying drawings, I have shown and described a preferred embodiment of my invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

The thickener shown in the drawings comprises a circular sump or tank having as shown a sloping outer wall 2; the bottom 6 and wall may be of earth or concrete or other structural material. An overflow trough 4 serves as the discharge launder. A circular track 3 is provided near the rim 2. Track 3 and trough 4 as shown are mounted on a pile structure. A gradually sloping bottom portion 6 empties into a central discharge trench or well 8 for the concentrated sludge or slurry, said trench 8 being formed, as shown, between the more sharply inclined part 10 of the tank bottom and a conical outward flare 12 on a central torque-reaction tube 14.

Two rake-carrying frames are shown, one having long bridge-like arms 16, of truss frame construction, extending between the tractor track 3 and a central bearing portion 18 rotatably mounted upon the central tubular member 19 supported upon the torque tube 14 through housing 46. This bearing portion 18 has no provision for vertical adjustment.

The other rake-carrying frame 22 carries the shorter arms 20 and is mounted for turning movement by a pair of bearing tracks 24 and 25 by means of a yoke structure 26 shown in Figure 8 and further described below. This yoke structure 26 carrying wheels 28 is supported through a frame 30 on a hydraulic jack or elevator 34. This elevator frame 30 includes horizontal I-beams 36 which extend through slots 38 in the upper part of the tube 14, the yoke structure 26 being supported on these I-beams outside the tube 14.

Figure 1:
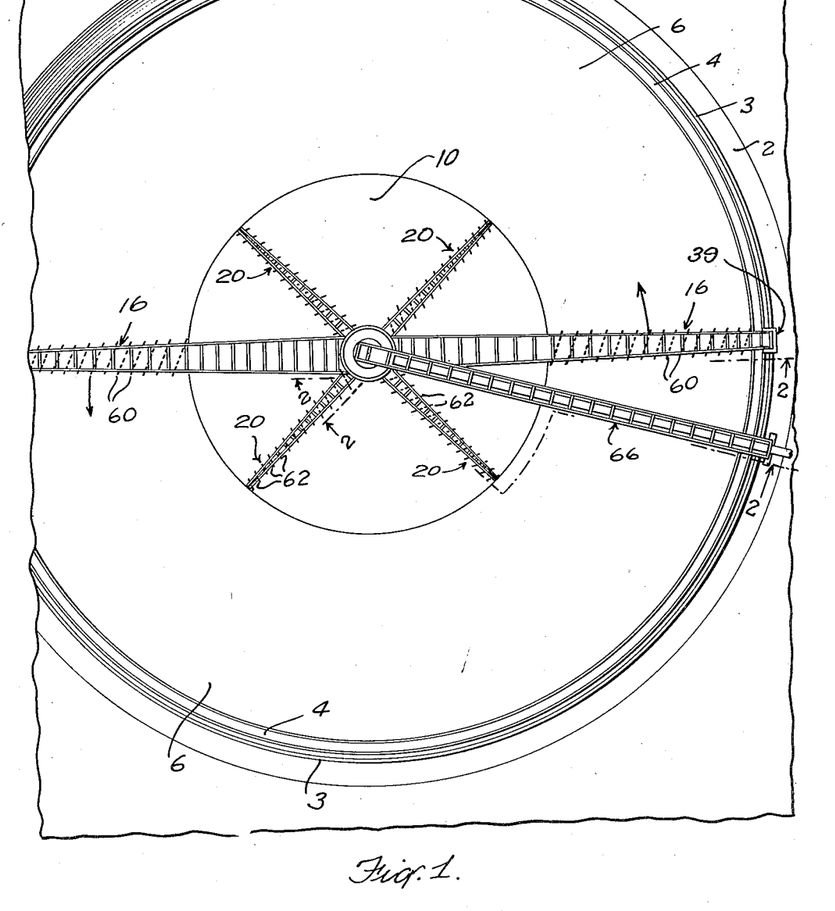
Figure 1 is a plan view of a thickener embodying the present invention.
Figure 4:
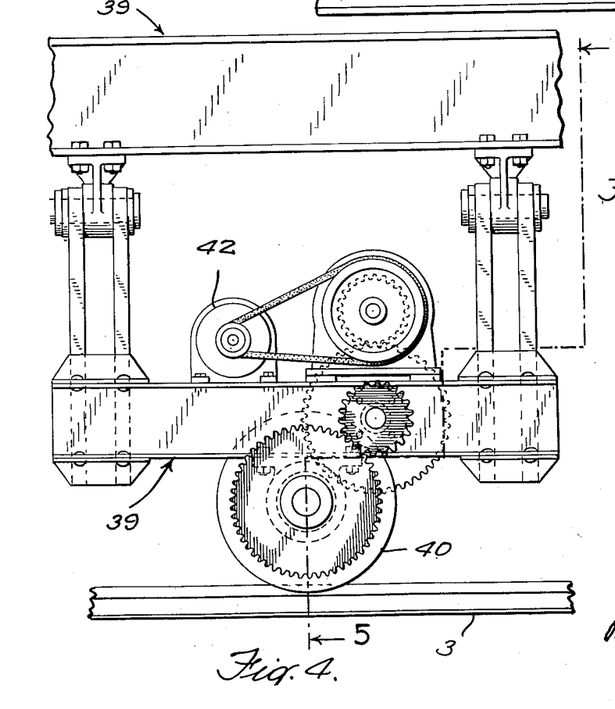
Figures 4 and 5 are detail views in end elevation and fragmentary section on line 5—5 of Figure 4 respectively showing one form of tractor drive for the outer ends of the longer arms.
Figure 5:
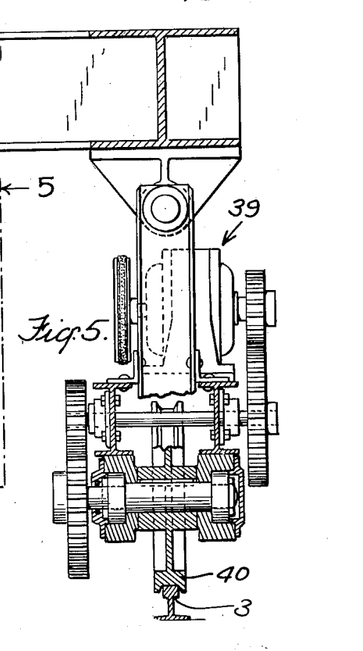
Figure 6:
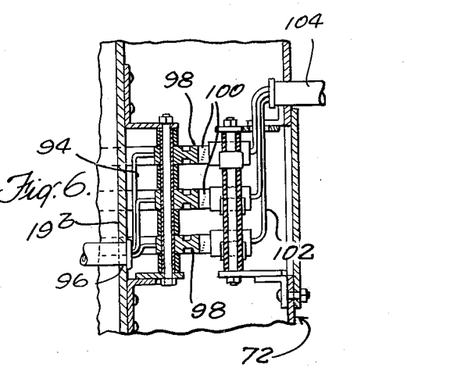
Figure 6 is an enlarged detail of the collector ring and brush structure which is also shown in the upper right-hand portion of Figures 3 and 7.

The bridge-like arms 16 are supported at their outer ends on small trucks 39 (Figures 1, 4 and 5), which may comprise a driving wheel or wheels 40 and an electric motor 42 connected to the driving wheels 40 through suitable reduction gearing as shown.

It is, of course, possible to effect the tractive drive at the outer ends of the drive 16 in other manner but this provides a simple solution of the problem of delivering the turning torque for the long-armed rake-carrying frame to the long arms at their outer ends.

The frame 22 carrying the short arms 20 may be driven in any suitable manner, e. g., from an electric motor 44 through reducing gearing within the housing 46, which may be, for example, the same as that shown and described in said copending application Serial No. 588,278. This gearing terminates in a ring gear 47 having arms or spokes 48 provided with wheels or rollers 49 which engage vertical faces 50 of the slots or arms extending upwardly in the drum or frame 22, as more fully shown in the said copending application Serial No. 588,278.

Figure 3:
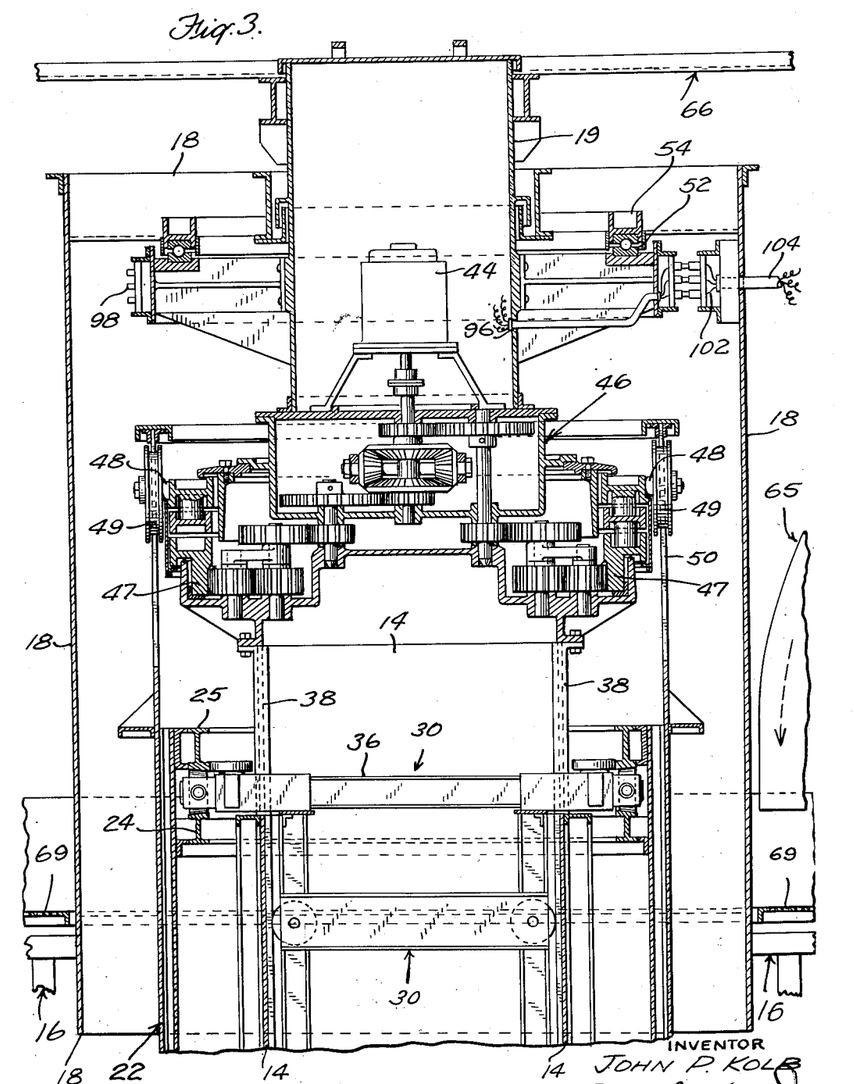
Figure 3 is an enlarged detail of structure shown in Figures 1 and 2, but in vertical section on an axial plane parallel to the plane of Figure 2.

It is desirable to provide an intermediate support for the bridge-like arms 16 of the long armed frame by providing a bearing above the inner drive mechanism just described. This, as shown in Figure 3, comprises a ring-like support 52 supported on the tubular member 19 from the top of the housing 46 and provided with a bearing face and a ring-like member 54 connected to the frame 18 and through it to the arms 16 and provided with a bearing face to cooperate with the bearing face on 52 to accommodate rotation about the axis of the tubular member 14.

Inclined rake blades 60 are carried by the long arms 16 in the outer reaches of these arms, that is, so that they engage the bottom 6 of the tank between the outer ring 2 and the intermediate bearing frame 18, the innermost ends of rakes 60 acting to deliver the sediment to a point where it will be picked up by the outermost end of rake blades 62 carried by the arms 20 on the short arm frame. With this arrangement it will be seen that the slowly traveling rake-blades 60 of the long arms 16 will act upon the sediment accumulating on the outer areas of the bottom 6 of the tank which lie within the zone of operation of the outer reaches of the arms 16 and will move this settled solids material toward the central area where it is picked up by the rake blades 62 of the short arms 20 and moved to the discharge trench 8 together with the heavier solids normally settling in this central area.

The fluid suspension which is to be concentrated, washed, classified, or otherwise treated, is delivered to the tank near its center as hereinabove pointed out by any suitable means such, for example, as a launder 65 carried on the under side of a fixed service bridge 66 in the form of a truss frame extending from a support outside the rim 2 and track 3 to the center structure 14. An annular distributor trough 68 having a perforated bottom 69 is provided to quiet the influent material before it passes into the tank proper.

From the foregoing description it will be seen that the influent is delivered to the distributor trough 68 and passes through the perforated bottom 69 thereof into the sedimentation tank near its center. The heavier solids of the slurry or pulp will settle out near the discharge trench 8 and progressively lighter particles will settle through the fluid as it flows toward the overflow launder 4, the major part of the solids settling out within the range of operation of the arms 20 of the short armed rake-carrying frame. Because of the expanding circumference the rate of flow decreases as the distance from the center increases, and thus the slowly settling semi-colloidal matter has time to settle out of the fluid before it is overflowed into the launder 4.

Figure 7:
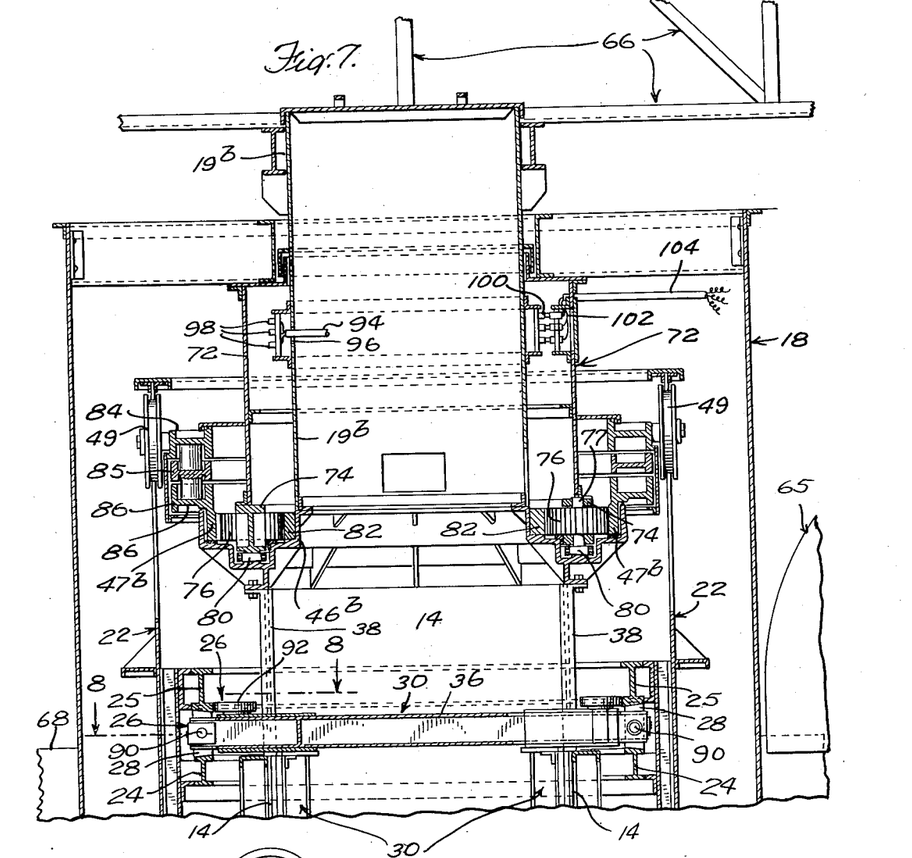
Figure 7 is a view in axial section similar to Figure 3 but showing a modified drive mechanism.

Instead of driving the longer arms 16 by motors 42 on the trucks 39 and the shorter arms 20 by a separate motor 44, the longer and shorter arm frames respectively may be geared together, e. g., as shown in Figure 7 or as set forth in the U. S. Patent No. 1,135,997, but with the gear ratio such that the outermost rakes on the longer arms move at a lower linear velocity than the average velocity of the rakes on the shorter arms, and advantageously at a velocity equal to, or lower than, the velocity of the rakes nearest to the sludge discharge outlet. Other means of driving may also be used, e. g., as described and claimed in copending applications, Serial Nos. 648,157 and 648,158, both filed on February 16, 1946.

Figure 10:
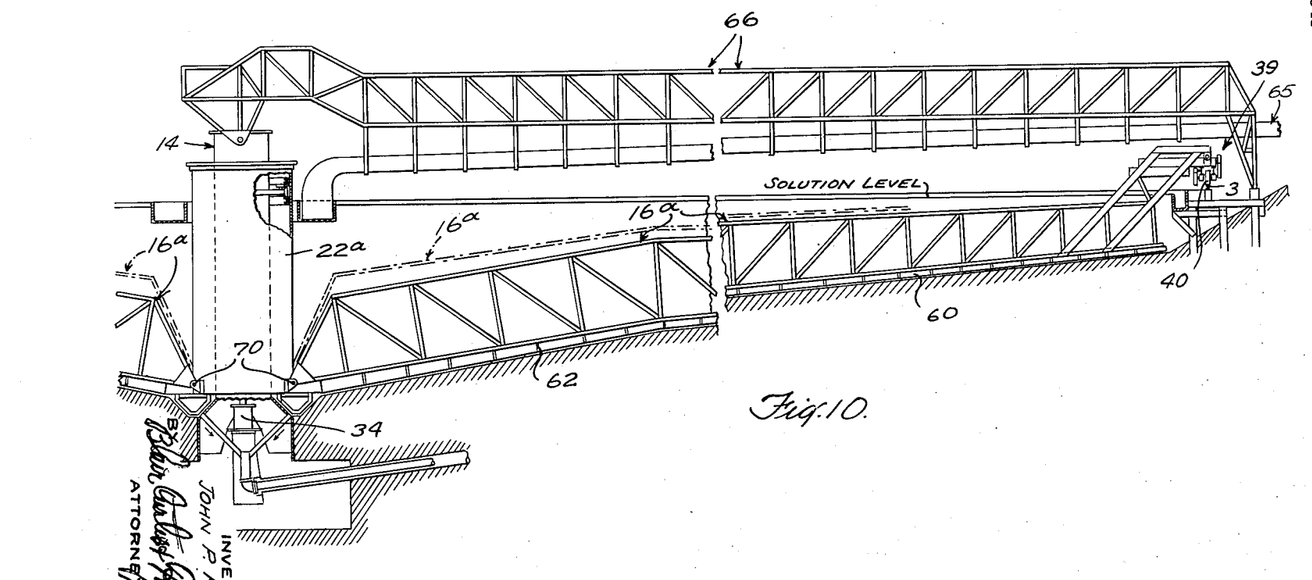
Figure 10 is a view similar to Figure 2 but with a single central lifting frame for the scraper arms.

In Figure 10 is shown an apparatus embodying some but not all of the inventive features described above. In this case long arms 16a are used supported on a peripheral track 3 as in the case of the arms 16; but in this case scrapers 60 and 62 may be carried throughout the full length and the inner ends of these long arms are hinged at 70 to a rotating frame or drum 22a carried by the elevator 34. The track and wheel arrangement shown in this figure is as more clearly shown on Figure 4 and described below.

Figure 9:
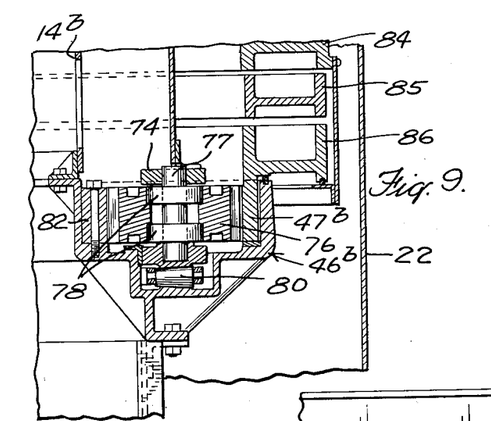
Figure 9 is an enlarged sectional detail taken on the same plane as Figure 7.

In the device shown in Figure 7, instead of having a separate motor and geared drive to the central rotating drum and short rake-carrying arms, the longer arms 16 are carried on a torque drum 72 and this in turn has secured to its bottom a torque ring 74 in which are mounted at angularly spaced intervals planetary gears 76 carried on stub shaft 77 by anti-friction bearings 78 (Figure 9). The ring 74 itself is carried on annular roller bearings 80.

A ring gear 82 secured in the housing 46b acts as a sun gear in the planetary system, and being fixed against rotation, therefore requires rotation of the planetary gears about their shafts 77 when the long arms 16 are rotated.

Figure 2:
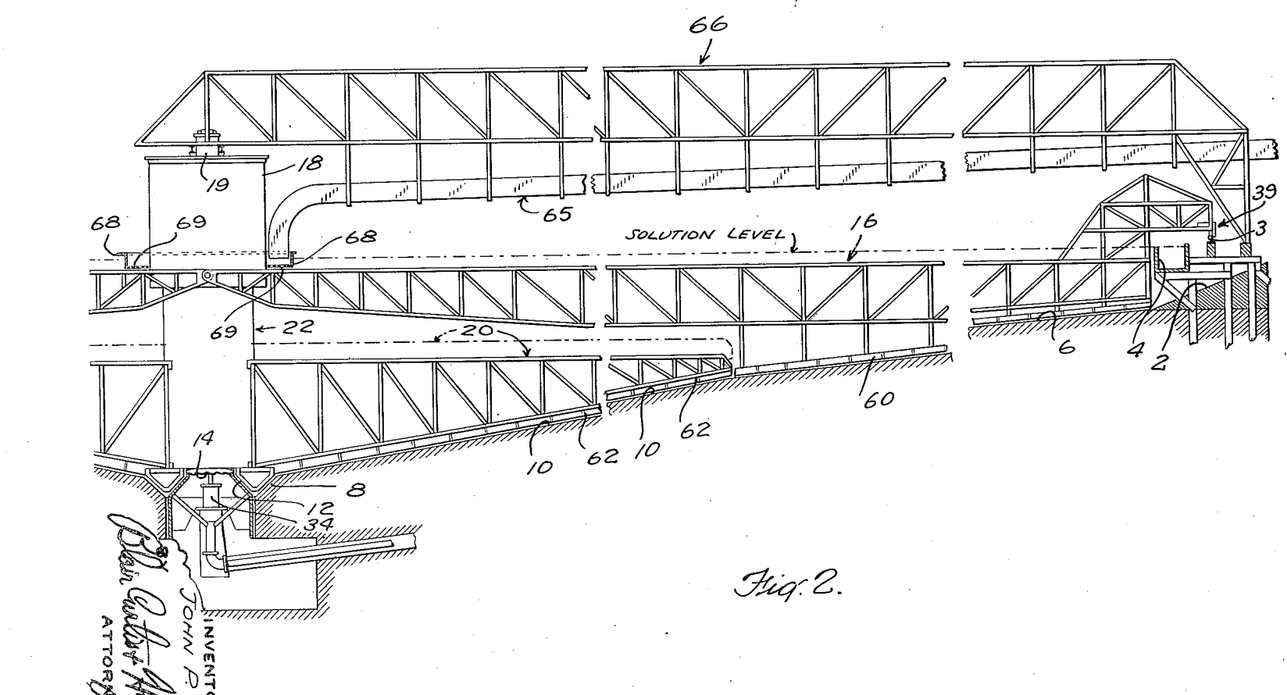
Figure 2 is a section taken on line 2—2 of Figure 1 with the long arms 16 swung under the launder bridge 66 for a clearer showing.

An annular ring gear 47b meshes with the planetary gears 76 at their outer periphery and thus is driven at a speed slightly less than twice the speed of rotation of the long arms 16. This ring gear assembly 47b comprises a coupling consisting of the three rings 84, 85, 86, and pivoted arm connections at the ends of one diameter between two of these rings and at the end of the perpendicular diameter between the other two of the rings, as more particularly described and claimed in the copending application Serial No. 588,278. The frame 22 for the shorter arms in this case may be identical with that described above in connection with Figures 1 and 2, and likewise the elevator mechanism and the supporting tracks 24 and 25 may be the same as in Figures 1, 2 and 3.

Figure 8:
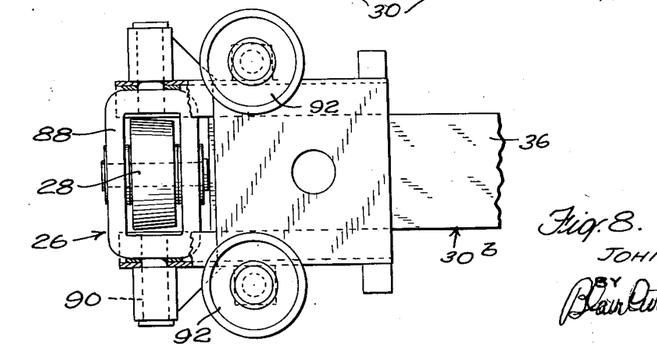
Figure 8 is an enlarged detail in plan view and horizontal section taken on line 8—8 of Figure 7.

In the structures shown in Figures 3, 7 and 8, the wheel 24b is mounted on the elevator frame by means of yokes 88 pivoted in trunnions 90. The wheels 28 are made conical as shown, to compensate for the difference in radius and provide smooth frictionless rolling on the tracks 24 and 25. Rollers 92 engage the inner edge of the track 25 and serve to keep the track centered with respect to the supporting frame 30.

In the operation of this device, the long arms 16 are driven by the motors 42 and these in turn drive the frame 18 and torque drum 72 to which they are connected at the center. Through the ring 74 the planetary gears 76 are driven about the sun gear 82, and as they roll around, drive the ring gear 47b at a rotational speed nearly twice that of the long arms 16. Through the Oldham coupling and the rollers 49, the central frame 22, on which are carried the short arms 20, is rotated at this same higher speed. In the event of overloading in the central area, the frame 22 is raised by the elevator mechanism in the same manner as previously described, and this raising or lowering is independent of the rotational operation and of the vertical positioning of the long arms 16 and the rakes mounted thereon.

Power lines 94 for the driving motors 42 are brought through the center of the central torque tubes 14 and/or 19 and led through an opening 96 to connect with collector rings 98. Brushes 100 are mounted on the torque drum 72, as shown on the right-hand side of Figure 7 or directly on 18, as shown in Figure 3, and power lines 102 connected with these brushes pass through the conduit 104 along the arms 16 to the motors 42. To avoid unnecessary confusion in the drawings the electrical lines supplying power to the motors are shown only in part in Figures 3 and 7.

From the foregoing description it will be seen that the invention provides a thickener construction in which efficient operation of the means for moving the settled solids toward the central discharge trench of the tank is combined with means for preventing interruptions of the operation or, in other words, for insuring continuous operation in cases of sudden surges of input into the tank, thus causing excessive sedimentation of the heavier solids within the range of operation of the rake-carrying arms 20. When this occurs it will be seen that the short-armed rake-carrying frame may be lifted by operation of the hydraulic jack or elevator 34 and its rakes will thus be raised to a point at which they can still move without excessive strain under the turning torque applied to the drum 22 through the reduction gearing from the motor 44. By gradually lowering the short-armed rake-carrying frame by means of the hydraulic jack or elevator 34, the excessive accumulation of sludge in the area of operation of the rake-carrying arms 20 can be reduced until the arms 20 can assume their original lowered position. During all of this time there will be a slow, uninterrupted drive of the long arms 16 of the long-armed rake-carrying frame.

What I claim is:

1. In settling apparatus, in combination, a centrally fed settling tank having an outlet near the upper periphery of the tank and having a central discharge for settled material, a first rake-carrying frame rotatable about a vertical axis substantially at the center of said tank, said first frame having arms extending to the periphery of said tank, the outer reaches of said arms being provided with rakes positioned close to the bottom of said tank, a second rake-carrying frame rotatable about the same axis as said first frame and having arms of shorter radius than those of said first frame, the arms of said second frame being provided with rakes normally positioned near the bottom of said tank, frame-supporting means at the center of said tank for supporting said first and second frame, first driving means operatively connected with said first frame for rotating said frame at a first predetermined rate and second driving means operatively connected with said second frame for rotating said second frame at a second predetermined rate whereby said second frame may be rotated at a higher rate than said first frame to cause the average linear speed of the rakes near the central portion of said tank and the average linear speed of the rakes near the periphery of said tank to be more nearly equal than they would be if all said rakes were mounted on a single frame.

2. In settling apparatus, in combination, a centrally fed settling tank having an outlet near the upper periphery of the tank and having a central discharge for settled material; a first rake-carrying frame rotatable about a vertical axis substantially at the center of said tank; said first frame having arms extending to the periphery of said tank, the outer reaches of said arms being provided with rakes positioned close to the bottom of said tank; a second rake-carrying frame rotatable about the same axis as said first frame, and having arms of shorter radius than those of said first frame, the arms of said second frame being provided with rakes normally positioned near the bottom of said tank; frame-supporting means at the center of said tank for supporting said first and second frames, said frame-supporting means including a bearing rotatably supporting the second frame and lifting means supporting said bearing to lift said second frame independently of said first frame to relieve overload in the central area of said tank; said first frame being rotatable beyond the range of movement of said second frame to permit the lifting of said bearing and second frame without interfering with the rotatability of either frame; first driving means operatively connected to said first frame for rotating said frame at a first predetermined rate; and second driving means operatively connected to said second frame for rotating said second frame at a second pre-determined rate, whereby said second frame may be rotated at a higher rate than said first frame to cause the average linear speed of the rakes near the central portion of said tank and the average linear speed of the rakes near the periphery of said tank to be more nearly equal than they would be if all said rakes were mounted on a single frame.

3. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank, the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames, said frame-supporting means including a first bearing rotatably supporting said first frame, a second bearing rotatably supporting said second frame, and lifting means supporting said second frame to lift said second frame independently of said first frame to relieve overloads in the central area of said tank, said first frame being located above said second frame and spaced above the second frame a sufficient distance to provide a clearance for the load-relieving lifting movement of the second frame; first driving means opratively connected with said first frame for rotating said frame at a first pre-determined rate, and second driving means operatively connected with said second frame for rotating said second frame at a second pre-determined rate, whereby said second frame may be rotated at a higher speed than said first frame to cause the average linear speed of the rakes near the central portion of said tank and the average linear speed of the rakes near the periphery of said tank to be more nearly equal than they would be if all said rakes were mounted on a single frame.

4. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank; the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames, said frame-supporting means including a first bearing rotatably supporting said first frame, a second bearing rotatably supporting said second frame, and lifting means supporting said second frame to lift said second frame independently of said first frame to relieve overloads in the central area of said tank, said first frame being located above said second frame and spaced above the second frame a sufficient distance to provide a clearance for the load-relieving, lifting movement of the second frame; first driving means operatively connected with said first frame for rotating said frame at a first pre-determined rate; second driving means operatively connected with said second frame for rotating said second frame at a second pre-determined rate; and first and second motor means connected to said first and second driving means respectively, to provide an independent drive for each of said two frames, whereby said second frame may be rotated at a higher speed than said first frame to cause the average linear speed of the rakes near the central portion of said tank and the average linear speed of the rakes near the periphery of said tank to be more nearly equal than they would be if all said rakes were mounted on a single frame.

5. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank, the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames, said frame-supporting means including a first bearing rotatably supporting said first frame, a second bearing rotatably supporting said second frame and lifting means supporting said second frame to lift said second frame independently of said first frame to relieve overloads in the central area of said tank, said first frame being located above said second frame and spaced above the second frame a sufficient distance to provide a clearance for the load-relieving, lifting movement of the second frame; first motor means located near the outer end of said first frame and operatively connected therewith for rotating said frame at a first pre-determined rate; and second motor means mounted at the center of said tank on said supporting means and operatively associated with said second frame for rotating said second frame at a second pre-determined rate, whereby said second frame may be rotated at a higher speed than said first frame to cause the average linear speed of the rakes near the central portion of said tank and the average linear speed of the rakes near the periphery of said tank to be more nearly equal than they would be if all said rakes were mounted on a single frame.

6. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank, the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames, said frame-supporting means including a first bearing rotatably supporting said first frame, a second bearing rotatably supporting said second frame, and lifting means supporting said second frame to lift said second frame independently of said first frame to relieve overloads in the central area of said tank, said first frame being located above said second frame and spaced above the second frame a sufficient distance to provide a clearance for the load-relieving, lifting movement of the second frame; motor means located at the outer end of said first frame and operatively connected therewith for rotating said frame; and gear means interconnecting the central portions of said first and second frames to cause said second frame to be driven by movement of said first frame, whereby said second frame may be rotated at a higher speed than said first frame to cause the average linear speed of the rakes near the central portion of said tank and the average linear speed of the rakes near the periphery of said tank to be more nearly equal than they would be if all said rakes were mounted on a single frame.

7. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank, the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames; first motor means located near the outer end of said first frame and operatively connected to said first frame to rotate said first frame; and second motor means mounted at the center of said tank on said supporting means and operatively connected to said second frame to rotate said second frame, whereby said second frame may be rotated at a higher rate than said first frame to cause the average linear speed of the rakes near the central portion of said tank and the average linear speed of the rakes near the periphery of said tank to be more nearly equal than they would be if all said rakes were mounted on a single frame.

8. In settling apparatus, in combination, a centrally fed settling tank having an outlet near the upper periphery of the tank and having a central discharge for settled material; a first rake-carrying frame rotatable about a vertical axis substantially at the center of said tank, said first frame having arms extending to the periphery of said tank, the outer reaches of said arms being provided with rakes positioned close to the bottom of said tank; a second rake-carrying frame rotatable about the same axis as said first frame and having arms of shorter radius than those of said first frame, the arms of said second frame being provided with rakes normally positioned near the bottom of said tank; frame-supporting means at the center of said tank for supporting said first and second frames; motor means located at the outer end of said first frame and operatively connected to said first frame to drive said first frame; and gear means interconnecting the central portions of said first and second frames to cause said second frame to be rotated by movement of said first frame, whereby said second frame may be rotated at a higher rate than said first frame to cause the average linear speed of the rakes near the central portion of said tank and the average linear speed of the rakes near the periphery of said tank to be more nearly equal than they would be if all said rakes were mounted on a single frame.

JOHN P. KOLB.

REFERENCES CITED

The following references are of record in the file of this patent:

UNITED STATES PATENTS

| Number | Name | Date |
|---|---|---|
| 1,135,997 | Dorr | Apr. 20, 1915 |
| 1,734,044 | Orr | Nov. 5, 1929 |
| 1,995,224 | Pruss | Mar. 19, 1935 |
| 2,360,817 | Scott | Oct. 17, 1944 |
| 2,368,703 | Bousman | Feb. 6, 1945 |
| 2,370,120 | Bousman | Feb. 27, 1945 |